(12) United States Patent
Carroll et al.

(10) Patent No.: US 8,691,416 B1
(45) Date of Patent: Apr. 8, 2014

(54) MODULAR VEHICULAR POWER SYSTEM HAVING A BATTERY INTERFACE MODULE AND ASSOCIATED METHOD

(75) Inventors: Michael L. Carroll, Harvest, AL (US); Larry Alan Foy, Huntsville, AL (US)

(73) Assignee: The Boeing Company, Chicago, IL (US)

( * ) Notice: Subject to any disclaimer, the term of this patent is extended or adjusted under 35 U.S.C. 154(b) by 898 days.

(21) Appl. No.: 12/706,258

(22) Filed: Feb. 16, 2010

(51) Int. Cl.
*H01M 2/10* (2006.01)
*H01M 10/38* (2006.01)

(52) U.S. Cl.
USPC ............. 429/123; 429/99; 429/100; 429/121; 439/500

(58) Field of Classification Search
USPC ............... 429/96, 99, 100, 121, 123; 439/500
See application file for complete search history.

(56) References Cited

U.S. PATENT DOCUMENTS

| | | | |
|---|---|---|---|
| 3,766,399 A | 10/1973 | Demetrescu | |
| 4,027,485 A | 6/1977 | Wallis | |
| 4,144,864 A | 3/1979 | Kato et al. | |
| 4,541,387 A | 9/1985 | Morikawa | |
| 5,678,646 A | 10/1997 | Fliege | |
| 6,027,828 A * | 2/2000 | Hahn | 429/100 |
| 6,104,967 A * | 8/2000 | Hagen et al. | 700/293 |
| 6,154,381 A | 11/2000 | Kajouke et al. | |
| 6,155,612 A * | 12/2000 | Szabo | 285/319 |
| 6,349,683 B1 | 2/2002 | Annen et al. | |
| 6,885,920 B2 | 4/2005 | Yakes et al. | |
| 7,338,335 B1 | 3/2008 | Messano | |
| 2010/0247979 A1 * | 9/2010 | Ha et al. | 429/7 |

FOREIGN PATENT DOCUMENTS

WO    WO 2008035872 A1 *    3/2008

OTHER PUBLICATIONS

Indy Power Systems, *Multi-Flex™ Energy Management—Hybrid and Electric Vehicles*, http://www.indypowersystems.com/products/hybrid-and-electric-vehicles.html (visited Sep. 21, 2009), 3 pages.

* cited by examiner

*Primary Examiner* — Jonathan G Leong
(74) *Attorney, Agent, or Firm* — Alston & Bird LLP (57) ABSTRACT

A battery interface module is provided that includes a housing and a battery interface carried by the housing and configured to interface with a battery. The battery interface may include a first power bus interface, a first fluid interface and a first data interface. The battery interface module may also include first and second transmission interfaces carried by the housing. At least one of the first and second transmission interfaces may be configured to interface with another battery interface module. Each transmission interface may include a second power bus interface, a second fluid interface and a second data interface. Additionally, the first and second power bus interfaces may be in electrical communication, the first and second fluid interfaces may be in fluid communication and the first and second data interfaces may be communicably connected.

17 Claims, 7 Drawing Sheets

MODULAR VEHICULAR POWER SYSTEM HAVING A BATTERY INTERFACE MODULE AND ASSOCIATED METHOD

TECHNOLOGICAL FIELD

Embodiments of the present disclosure relate generally to vehicular power systems and, more particularly, to vehicular power systems constructed in a modular fashion.

BACKGROUND

Batteries are carried by most vehicles, including most wheeled and tracked vehicles, in order to provide power in at least certain circumstances. For example, the batteries may provide the power necessary for starting the vehicle or for operating various electrical devices in instances in which the engine is not running. In order to provide power to the various electrical systems of a vehicle, batteries typically have a power interface via which an electrical connection is established between the battery and the various electrical devices of the vehicle. Some batteries also have other interfaces, such as fluid interfaces and data interfaces. A fluid interface permits a coolant fluid to be circulated from the vehicle to the battery prior to being returned to the vehicle. By appropriately controlling the temperature of the coolant fluid prior to its delivery to the battery, the coolant fluid may serve to cool the battery so as to facilitate the operation of the battery. With respect to a data interface, some batteries include a memory device for storing certain types of data, such as temperature, current and voltage. As such, a data interface permits the vehicle, such as a computer system onboard the vehicle, to retrieve data from the battery and/or to write data to the battery via the data interface.

Although batteries may each have a power interface and may sometimes have a fluid interface and/or a data interface, vehicular platforms are commonly designed to have differently configured battery interfaces. Thus, even though the batteries onboard different types of vehicular platforms may each include power, fluid and data interfaces, the interfaces may be differently designed for each vehicular platform. Not only does the design of a new configuration for the interfaces increase the costs associated with the design of a new vehicular platform, but the differences between the battery interfaces may create other disadvantages.

In this regard, the use of different battery interfaces limits or prevents scalability. Indeed, since many vehicles are designed to have a particular engine and power solution that is unique to that type of vehicle, the power solution including the unique battery interfaces will not apply to vehicles having power solutions with different sizes or capabilities, thereby requiring additional design efforts in conjunction with vehicles having the different power solutions. Additionally, the relatively limited interchangeability of batteries and battery interfaces between different vehicular platforms generally increases the costs required from a maintainability standpoint since those involved with the maintenance of the vehicles must be trained so as to work on a wider variety of vehicles having a number of different battery configurations and interfaces. Since many vehicles are based on a predefined power storage solution, including a particular configuration of batteries and an alternator, it may be difficult to upgrade or reconfigure the power storage solution to incorporate advancements in technology and/or to support different mission power profiles. For example, as the anticipated power demands upon the vehicle change over the course of time, such as in instances in which the vehicle is assigned to different missions, the unique design of many power storage solutions may prove to be difficult to adapt or to reconfigure to be more closely tailored to the changed power requirements.

As such, it would be desirable to provide an improved power system for a vehicle that is more readily scalable and maintainable. In addition, it would be desirable to provide an improved power system that could be more readily tailored to changes in the anticipated power requirements for the vehicle, such as in instances in which the mission to which the vehicle is assigned is changed.

BRIEF SUMMARY

According to embodiments of the present disclosure, a modular vehicular power system, a battery interface module and an associated method are provided. The battery interface module of one embodiment provides a common interface with a battery, such as a common power interface, a common fluid interface and/or a common data interface. By employing a common interface, the resulting power system may be more readily scaled and maintained, and the design efforts otherwise expended to develop interface solutions may be reduced. Additionally, the battery interface module of one embodiment permits multiple batteries to be interconnected so as to facilitate scalability of the resulting power system.

A battery interface module is provided in accordance with one embodiment of the present disclosure. The battery interface module includes a housing and a battery interface carried by the housing and configured to interface with a battery. The battery interface includes a first power bus interface, a first fluid interface and a first data interface. The battery interface module of this embodiment also includes first and second transmission interfaces carried by the housing. At least one of the first and second transmission interfaces is configured to interface with another battery interface module. Each transmission interface includes a second power bus interface, a second fluid interface and a second data interface. Additionally, the first and second power bus interfaces are in electrical communication, the first and second fluid interfaces are in fluid communication and the first and second data interfaces are communicably connected.

The battery interface module may also include a bus bar electrically connecting the second power bus interfaces of the first and second transmission interfaces. In this embodiment, the first power bus interface may be connected to the bus bar intermediate of the second power bus interfaces of the first and second transmission interfaces. The battery interface module may also include an internal data wiring harness extending between the first and second data interfaces. The battery interface module may also include an address module to define the address of the battery interface module.

The housing may include a plurality of exterior surfaces. In this embodiment, the battery interface and the first and second transmission interfaces may be carried by different exterior surfaces of the housing. The battery interface may also include an alignment feature that is configured to facilitate alignment between the battery interface module and the battery.

In one embodiment, one of the second power bus interfaces of the first and second transmission interfaces is male, and another of the second power bus interfaces of the first and second transmission interfaces is female. In this embodiment, one of the second fluid interfaces of the first and second transmission interfaces is male, and another of the second fluid interfaces of the first and second transmission interfaces is female. Similarly, one of the second data interfaces of the first and second transmission interfaces is male in this embodiment, and another of the second data interfaces of the first and second transmission interfaces is female.

A modular vehicular power system is also provided in accordance with another embodiment. The modular vehicular power system includes a plurality of batteries that collectively satisfy the power requirements of the vehicle. The modular vehicular power system also includes a plurality of battery interface modules. Each battery interface module includes first and second transmission interfaces configured to establish power, fluid and data interfaces with other battery interface modules. Each battery interface module also includes a battery interface to provide power, fluid and data interfaces with the respective battery. The first transmission interface of each battery interface module of one embodiment may be identical or may otherwise define power fluid and data interfaces that are configured to readily interconnected as described below. Likewise, the second transmission interface of each battery interface module of one embodiment may be identical or may otherwise define power fluid and data interfaces that are configured to readily interconnected as described below. Indeed, the power, fluid and data interfaces of the first transmission interface of each battery interface module may be configured to mate with corresponding power, fluid and data interfaces, respectively, of the second transmission interface of another battery interface module.

In one embodiment, the battery interface includes a first power bus interface, a first fluid interface and a first data interface. Each of the first and second transmission interfaces of this embodiment includes a second power bus interface, a second fluid interface and a second data interface. In this embodiment, the first and second power bus interfaces are in electrical communication, the first and second fluid interfaces are in fluid communication, and the first and second data interfaces are communicably connected. Each battery interface module of this embodiment may also include a bus bar electrically connecting the second power bus interfaces of the first and second transmission interfaces. The first power bus interface of this embodiment may also be connected to the bus bar intermediate of the second power bus interfaces of the first and second transmission interfaces. Each battery interface module of this embodiment may also include an internal data wiring harness extending between the first and second data interfaces.

Each battery interface module of one embodiment may include an address module to define the address of the battery interface module. In one embodiment, the battery interface may also include an alignment feature configured to facilitate alignment with the respective battery.

A method of satisfying the power requirements of a vehicle is also provided in accordance with one embodiment. The method provides a plurality of batteries that collectively satisfy the power requirements of the vehicle. The method of this embodiment also establishes connections between the plurality of batteries and a power bus, a data bus and a fluid coolant loop. In order to establish the connections, each battery is connected to a corresponding battery interface module. Additionally, a plurality of interconnected battery interface modules are connected to the power bus, the data bus and a fluid coolant loop. Each battery interface module includes first and second transmission interfaces configured to establish power, fluid and data interfaces with other battery interface modules. Each battery interface module also includes a battery interface to establish power, fluid and data interfaces with the respective battery.

The connection of the plurality of interconnected battery interface modules of one embodiment includes the connection of the battery interface modules in series. In one embodiment, the battery interface module includes a first power bus interface, a first fluid interface and a first data interface. Each of the first and second transmission interfaces of this embodiment may include a second power bus interface, a second fluid interface and a second data interface. The first and second power bus interfaces may be in electrical communication, the first and second fluid interfaces may be in fluid communication and the first and second data interfaces may be communicably connected.

Each battery interface module may include an address module to define the address of the battery interface module. The connection of each battery to a corresponding battery interface module may include aligning each battery with the corresponding battery interface module with corresponding alignment features carried by the battery and the corresponding battery interface module.

The features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWING(S)

Having thus described embodiments of the present disclosure in general terms, reference will now be made to the accompanying drawings, which are not necessarily drawn to scale, and wherein:

DETAILED DESCRIPTION

The present disclosure now will be described more fully hereinafter with reference to the accompanying drawings, in which some, but not all embodiments are shown. Indeed, the embodiments may take many different forms and should not be construed as limited to the embodiments set forth herein;

rather, these embodiments are provided so that this disclosure will satisfy applicable legal requirements. Like numbers refer to like elements throughout.

A modular vehicular power supply 10 is provided in accordance with embodiments of the present disclosure. The modular vehicular power supply may be designed to satisfy the power requirements of a variety of vehicles, including both wheeled and tracked vehicles for civilian, commercial and/or military uses. By employing a modular design, the vehicular power system can include any number of batteries 12, with the number of batteries generally being selected such that the power that the batteries are capable of providing in the aggregate at least satisfies the anticipated maximum power requirements for the vehicle. A wide variety of batteries may be employed in conjunction with embodiments of the present disclosure, including lead acid batteries, Lithium-Ion batters and other advanced chemistries for battery cell construction. In addition, the batteries may be identical, both in size and shape and in terms of the power provided by each battery. However, the batteries may be different in other embodiments, such that one or more batteries of a vehicular power system provide a first level of power, and one or more other batteries of the same vehicle power supply provide a different level of power. Regardless of the individual power contributions of the batteries and the differences that may exist therebetween, the sum of the power that the plurality of batteries are configured to provide should at least satisfy the power requirements that are anticipated for the vehicle.

Figure 1:
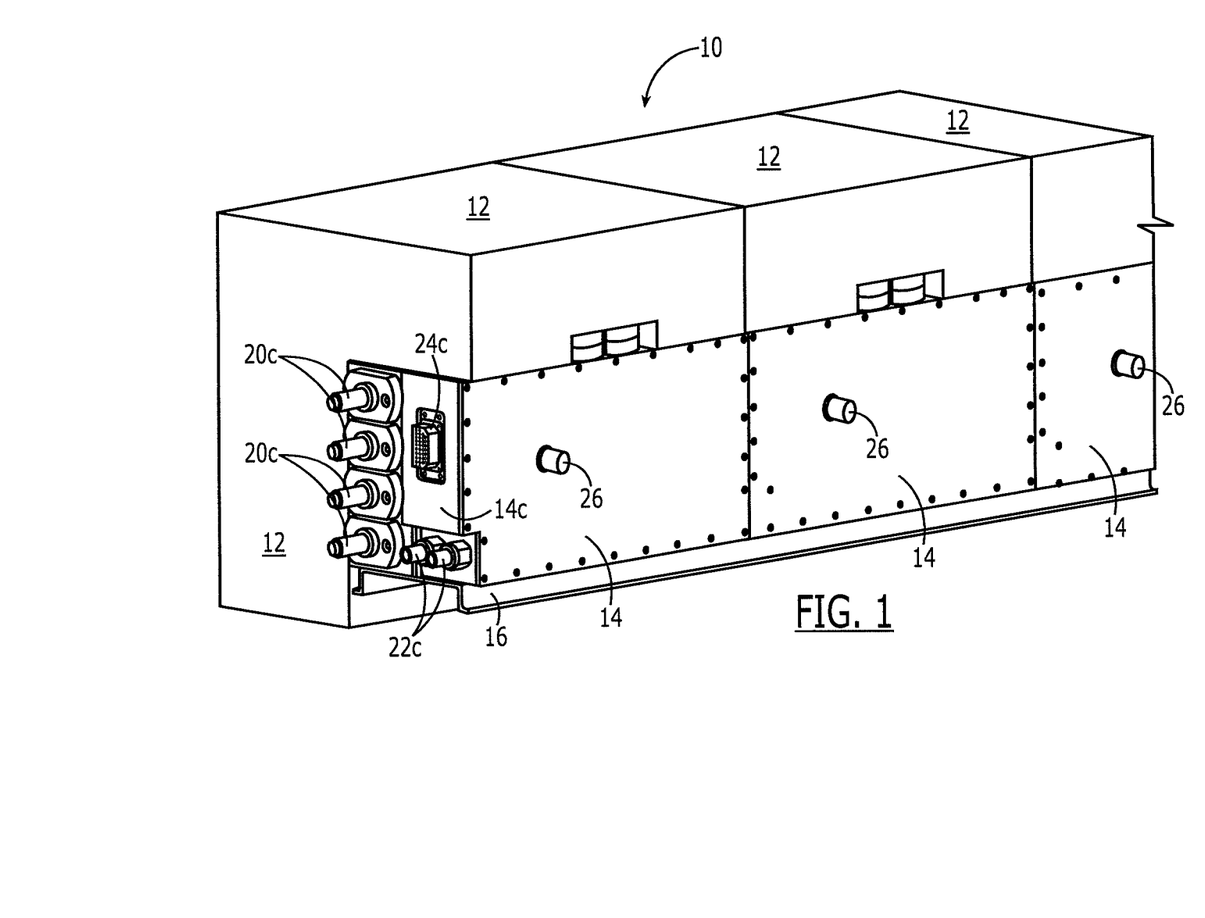
FIG. 1 is a perspective view of the modular vehicular power system having at least three batteries and at least three associated battery interface modules in accordance with one embodiment of the present disclosure.

Although the vehicular power system 10 may include any number of batteries 12, the vehicular power system depicted in FIG. 1 includes at least three batteries. In addition to a plurality of batteries, the vehicular power system 10 also includes a plurality of battery interface modules 14 mounted, in one example, upon a rail 16. As shown in FIG. 1, each battery interface module 14 is associated with and serially connected to a respective battery 12. As will be described below, each battery interface module 14 is also connected to at least one and, in some instances, two or more other battery interface modules. A battery interface module 14 generally includes a housing 15. In the embodiment of FIG. 1, the housing 15 has a generally rectangular solid shape. However, the housing 15 may have other shapes in other embodiments. As described below, the battery interface module 14 includes a battery interface 14a and first and second transmission interfaces 14b, 14c carried by the housing. A battery interface 14a is configured to interface with the respective battery 12, while at least one and, in some instances, both of the first and second transmission interfaces 14b, 14c are configured to interface with other battery interface module(s). In one embodiment in which the housing 15 includes a plurality of exterior surfaces, the battery interface 14a and the first and second transmission interfaces 14b, 14c may be carried by different exterior surfaces of the housing 15. For example, the first and second transmission interfaces 14b, 14c may be carried by opposed end surfaces of the housing 15, while the battery interface 14a may be carried by one of the side surfaces of the housing 15 that extends between the opposed end surfaces. In other embodiments, however, the housing 15 may be configured differently and the battery interface 14a and the first and second transmission interfaces 14b, 14c may be carried by the housing 15 in different manners.

Figure 2:
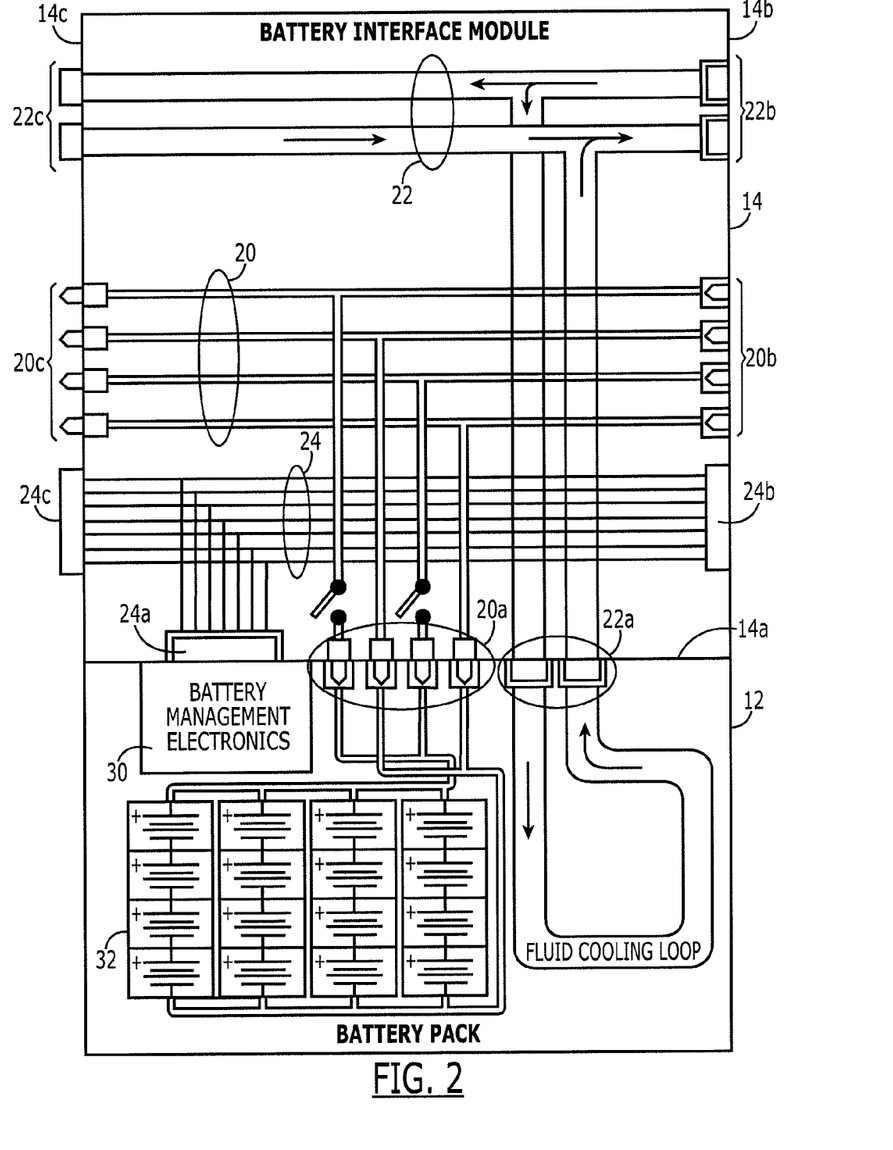
FIG. 2 is a schematic representation of a battery and an associated battery interface module in accordance with one embodiment of the present disclosure which depicts the power, fluid and data interfaces.

As shown in FIG. 2, the battery interface 14a may include a first power bus interface 20a, a first fluid interface 22a and a first data interface 24a. The first power bus interface may include connections for a positive power conductor and a negative power conductor. In this illustrated embodiment, the first power bus interface includes connections for two pairs of power conductors, that is, connections for two positive power conductors and two negative power conductors. By including connections for a plurality of pairs of power conductors, the first power bus interface provides redundancy. In addition, in instances in which an individual pair of power conductors is incapable of carrying the current that may be necessary in some situations, the use of a plurality of pairs of power conductors may increase the overall capacity of the first power bus interface to a level that equals or exceeds that anticipated to be required during operation. As shown in FIG. 2, the positive power conductors and the negative power conductors may be electrically connected to opposite poles of the battery cells 32.

The first fluid interface 22a may provide a supply connection and a return connection for coolant fluid. In this regard, the supply connection may permit coolant fluid, typically at a lower temperature, to be provided to the battery 12, while the return connection may permit coolant fluid, typically at a greater temperature to exit the battery. Within the battery, a coolant path may be defined between the supply connection and the return connection, with the coolant path being designed such that the coolant passes proximate those portions of the battery, such as the battery cells 32 and the battery management electronics 30, that are desirably cooled. In operation, the coolant fluid generally absorbs heat from the battery during circulation therethrough such that the temperature of the coolant fluid increases during its travel from the supply connection to the return connection.

The first data interface 24a provides connections for one or more wires or other data conduits, such as optical fibers or the like. In the illustrated embodiment, the first data interface provides connections for a plurality of wires or other data conduits. In the illustrated embodiment, the battery 12 includes battery management electronics 30 with which the first data interface is in communication. However, the battery need not necessarily include battery management electronics but may be configured to receive and/or provide data in a variety of other manners. The data that is transmitted to and from the battery via the first data interface may include a wide variety of different types of data, including avionics-related data, communications-related data and/or data defining the power level or remaining power of the battery. For example, the data that is transmitted to and from the battery may include battery voltage, individual battery cell voltages, current flow to/from the battery during charging/discharging events, temperature data and/or status data for command and control of the battery.

As also shown in FIG. 2, the first and second transmission interfaces 14b, 14c each similarly include a second power bus interface 20b, 20c, a second fluid interface 22b, 22c and a second data interface 24b, 24c. By connecting two or more battery interface modules 14 in series, the fluid cooling loop 22, the power bus 20 and the data bas 24 may continue serially from one battery interface module to the next, with branches coming off of the cooling loop, the power bus and the data bus within each battery interface module to service the respective battery 12. By way of example, for a battery interface module that is positioned between and interconnected with a pair of battery interface modules on either side, the battery interface module may be connected at its first transmission interface to the second transmission interface of one of the other battery interface modules so as to receive the coolant fluid, power and data. Correspondingly, the battery interface module may be connected at its second transmission interface to the first transmission interface of the other battery interface module so as to provide coolant fluid, power and data to the other battery interface module.

Figure 3:
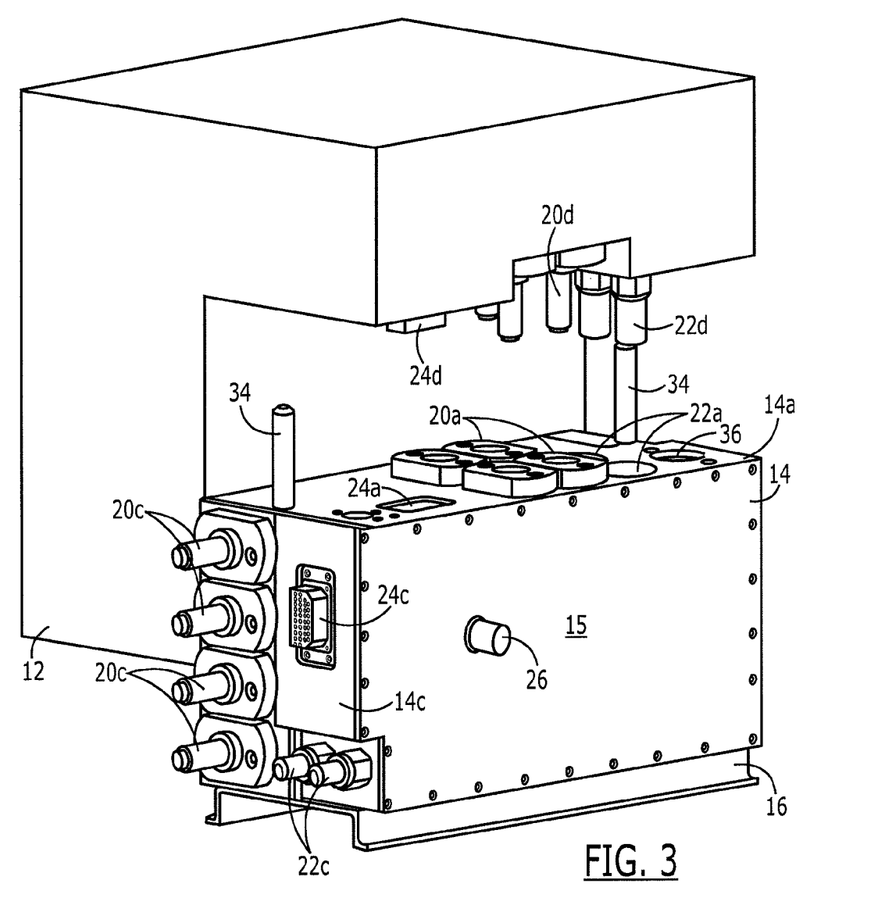
FIG. 3 is an exploded perspective view of a battery and an associated battery interface module in accordance with one embodiment of the present disclosure which depicts the power, fluid and data interfaces therebetween.
Figure 4:
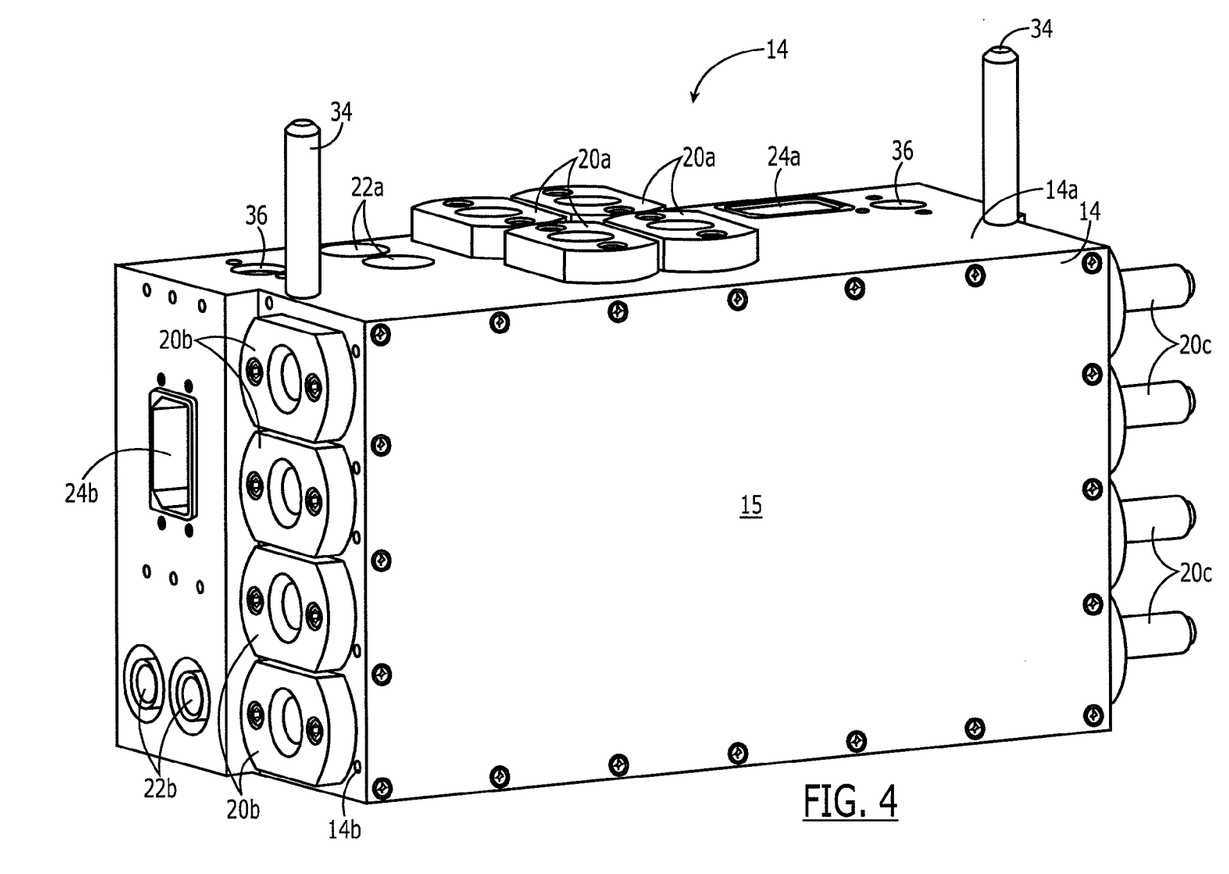
FIG. 4 is a perspective view of a battery interface module of one embodiment of the present disclosure taken from the opposite side from that depicted in FIG. 3.

The power bus interfaces, fluid interfaces and data interfaces may be physically configured in various manners. One embodiment is depicted, for example, in FIG. 3. In this embodiment, the battery interface 14a of the battery interface module 14, including the first power bus interface 20a, the first fluid interface 22a and the first data interface 24a, are female connectors configured to receive corresponding male connectors for the power bus interface 20d, the fluid interface 22d and the data interface 24d of the respective battery 12 in order to establish power, fluid and data communication between the battery interface module and the battery. In order to facilitate the engagement of the battery interface module with the battery, one or both of the battery interface module and the battery may include alignment mechanisms. In the illustrated embodiment, for example, the battery interface module includes at least one alignment pin 34 extending outwardly from the housing 15 for engaging a corresponding alignment aperture defined by the battery. In addition or alternatively, the battery may include an alignment pin extending outwardly therefrom for engaging a corresponding alignment aperture 36 defined by the housing of the battery interface module. The embodiment of FIG. 3 also shows the second transmission interface 14c. In the illustrated embodiment, the second transmission interface includes male connectors for the second power bus interface 20c, the second fluid interface 22c and the second data interface 24c. Each of these male connectors would be received by a corresponding female connector of, for example, another battery interface module that is positioned adjacent to the illustrated battery interface module. In this regard, FIG. 4 illustrates the opposite side of the battery interface module and correspondingly illustrates the first transmission interface 14b. As shown, the first transmission interface of the battery interface module of the illustrated embodiment includes female connectors for the power bus interface 20b, the fluid interface 22b and the data interface 24b and would be correspondingly configured to receive the male connectors of the second transmission interface for an adjacent battery interface module.

While one embodiment of the first and second transmission interfaces 14b, 14c of a battery interface module 14 has been described, the first and second transmission interfaces may be differently configured in other embodiments. For example, each of the transmission interfaces may include a mixture of male and female connectors so long as the mixture is selected such that appropriate connections can be established between the respective transmission interfaces of adjacent battery interface modules.

Figure 5:
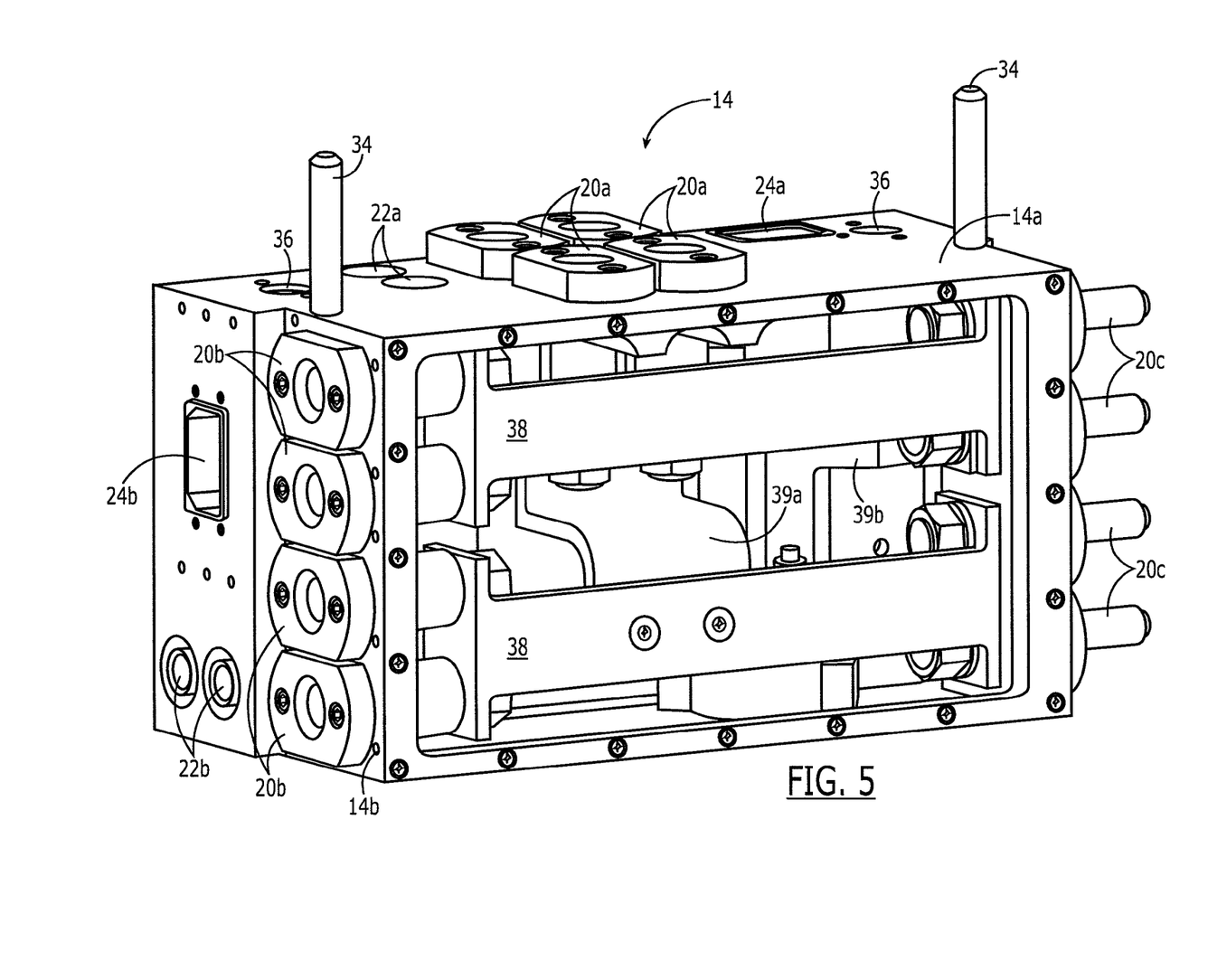
FIG. 5 is a perspective view of a battery interface module of FIG. 4 with one exterior panel of the housing being removed in order to illustrate one portion of the interior of the battery interface module in accordance with one embodiment of the present disclosure.
Figure 6:
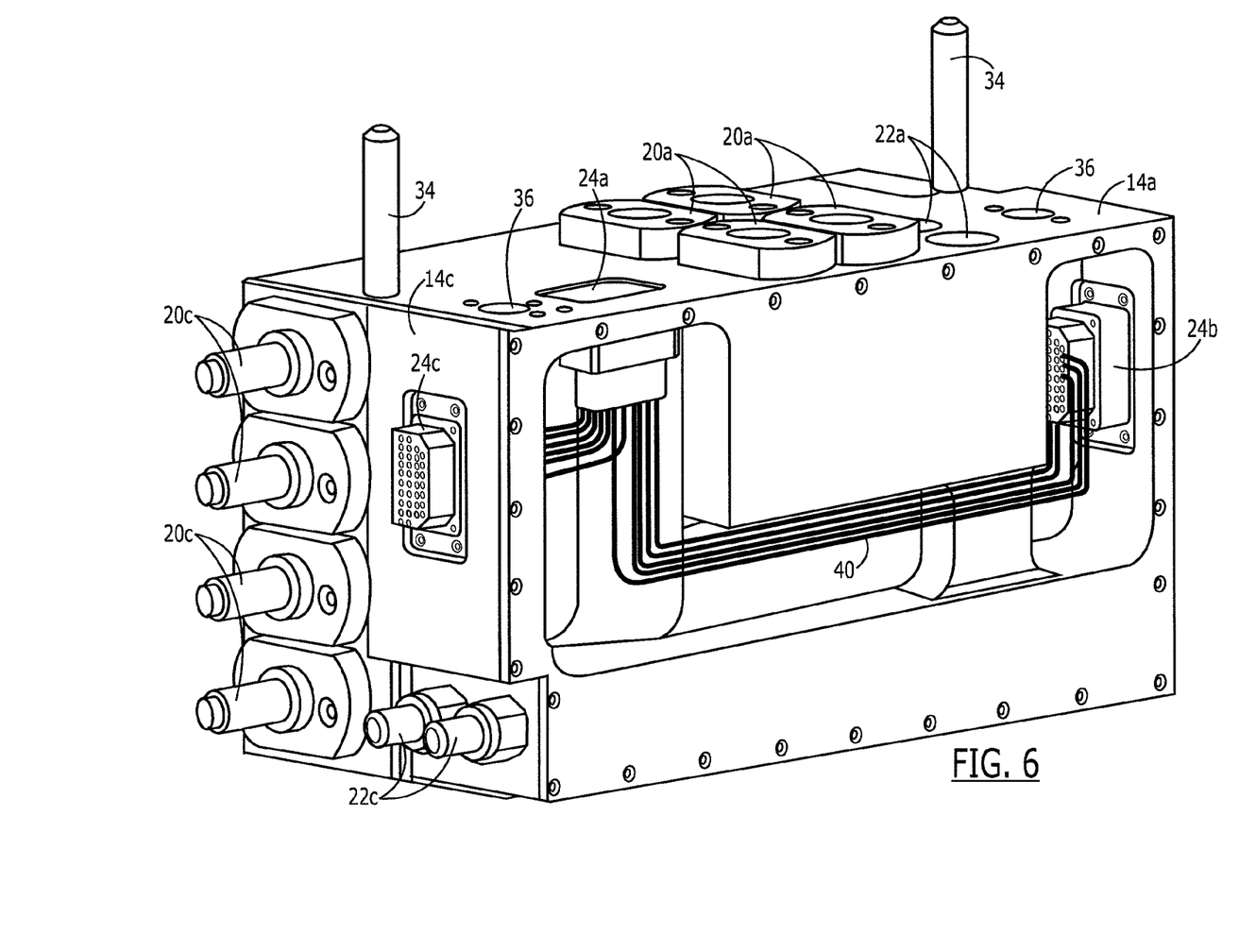
FIG. 6 is a perspective view of the battery interface module of FIGS. 4 and 5 with another exterior panel of the housing being removed to depict another portion of the interior of the battery interface module in accordance with one embodiment of the present disclosure.

In order to depict interior portions of the battery interface module 14 of one embodiment, FIGS. 5 and 6 are provided in which the exterior panels of the housing 15 have been removed from opposite sides thereof. As shown in FIG. 5, the battery interface module may include one or more bus bars 38 electrically connecting the second power bus interfaces 20b, 20c of the first and second transmission interfaces 14b, 14c. Indeed, the battery interface module may include a first bus bar, e.g., the lower bus bar in the embodiment of FIG. 5, for connecting the positive connectors of the second power bus interfaces of the first and second transmission interfaces, and a second bus bar, e.g., the upper bus bar in the embodiment of FIG. 5, for connecting the negative connectors of the second power bus interfaces of the first and second transmission interfaces. The battery interface module may also include electrical connections between the bus bars and/or the respective connectors of the first power bus interface 20a and the battery interface 14a. In this regard, an electrical connection 39a may be established between the first bus bar and the positive connector of the first power bus interface of the battery interface. In the illustrated embodiment, the electrical connection with the positive connector of the first power bus interface may be with a portion of the first bus bar that is intermediate the second power bus interfaces of the first and second transmission interfaces. Similarly, an electrical connection 39b may be established between the negative connector of the first power bus interface of the battery interface and the second bus bar and/or the negative connectors of the second power bus interfaces of the first and second transmission interfaces. Thus, the first power bus interface may be appropriately electrically connected to the power bus 20 that extends through the battery interface module via the bus bars of the illustrated embodiment.

With reference to FIG. 6, the battery interface module 14 may include an internal data wiring harness 40 that extends between the first and second data interfaces. As illustrated, the internal wiring harness of one embodiment includes a plurality of data conduits extending from the second data interface 24b of the first transmission interface 14b to the first data interface 24a of the battery interface 14a, and other data conduits extending from the first data interface of the battery interface to the second data interface 24c of the second transmission interface 14c. However, the internal data wiring harness of other embodiments may include at least some data conduits that extend directly between the second data interfaces of the first and second transmission interfaces. While an internal data wiring harness is illustrated, the first and second data interfaces may be communicably connected in other manners, including via optical fibers in other embodiments.

The battery interface module 14 of the illustrated embodiment also includes coolant fluid conduits extending between the second fluid interfaces 22b, 22c of the first and second transmission interfaces 14b, 14c. In this regard, the battery interface module of one embodiment includes a pair of coolant fluid conduits extending between the second fluid interfaces of the first and second transmission interfaces with one coolant fluid conduit serving to supply relatively cool coolant and another coolant fluid conduit serving to return coolant that has been heated as a result of its circulation through one or more batteries 12. Additionally, the battery interface module includes a pair of coolant fluid conduits branching off of the coolant fluid conduits that extend between the second fluid interfaces of the first and second transmission interfaces and extending to the first fluid interface 22a of the battery interface 14a, thereby permitting the coolant fluid to circulate through the associated battery. In one embodiment, the coolant fluid conduits are formed by passages formed, e.g., bored, through the material, such as aluminum, that forms the housing 15 of the battery interface module.

The battery interface module 14 may also include an address module 26. In one embodiment, each battery interface module is uniquely constructed. In order to allow communications to be directed to an individual battery interface module, each battery interface module may include an address module that defines a unique address for the respective battery interface module and, in turn, for the battery 12 associated with the battery interface module. Thus, the data wiring harness 40 advantageously communicates with the address module to determine the address assigned to the battery interface module and the battery so that communications to the battery interface module and the battery may be recognized and so that communications from the battery interface module and the battery may be associated with the respective address so as to be recognized as originating from the respective battery interface module and the associated battery.

As a result of the interconnectedness of the battery interface 14a and the first and second transmission interfaces 14b, 14c, the first and second power bus interfaces are in electrical communication, the first and second fluid interfaces are in fluid communication and the first and second data interfaces are communicably connected. Although the battery interface modules 14 have been described to be positioned adjacent one another and directly connected to one another, the battery interface modules of one embodiment may be spaced apart from one another, such as in instances in which the vehicle platform does not allow for the battery interface modules and associated batteries 12 to be positioned in a contiguous manner. In this embodiment, the battery interface modules that are spaced apart from one another may be connected by fluid conduits, a power bus and a data wiring harness so as to function as described above. Or, the battery interface modules that are spaced apart from one another may be separately connected to a coolant fluid supply, a power supply and a data source so as to form two or more distinct groups of interconnected batteries and battery interface modules.

The power bus, data bus and coolant fluid loop defined by a plurality of interconnected battery interface modules 14 may be terminated in various manners. For example, the battery interface modules may be configured such that the coolant fluid conduits are automatically closed or terminated if another battery interface module is not connected thereto (which connection serves to open the coolant fluid conduits). Alternatively, the battery interface module may include a termination plug for closing or terminating the coolant fluid conduits. Although the power bus need not be electrically terminated, the battery interface module may include a termination plug for closing power bus interface and preventing inadvertent access to the power bus. Finally, the data bus may be terminated in a variety of manners. For example, the battery interface module may include a termination cap for terminating the data bus. In this regard, the termination cap of one embodiment may include terminating resistors for appropriately terminating the conductor pairs of the data bus.

Figure 7:
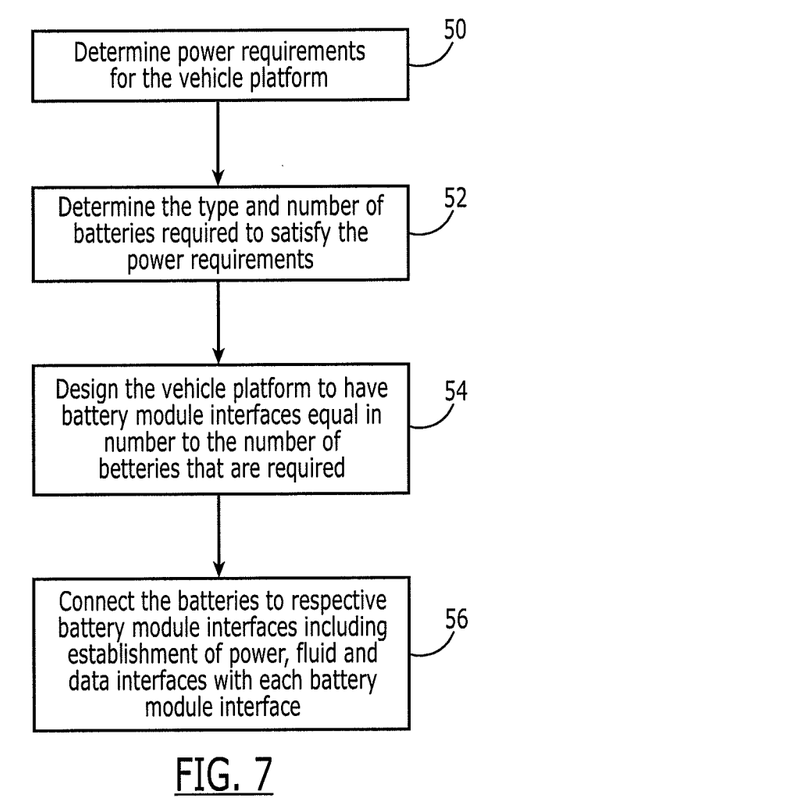
FIG. 7 is a flow chart illustrating operations performed in order to provide a power system designed to satisfy the power requirements of a vehicle in accordance with one embodiment of the present disclosure.

As a result of the modularity and standardization of the battery interface modules 14 and the connections provided by the battery interface modules, vehicular power systems 10 may be readily designed utilizing the battery interface modules and the associated batteries 12 as the building blocks to construct power systems that satisfy different power requirements of different vehicular platforms. As illustrated at operation 50 in FIG. 7, the design of a vehicular power system may commence with the determination of the power requirements for the vehicle, such as the maximum power requirements. Based upon the power requirements, a determination may be made as to the type of batteries to be utilized and the number of batteries to be utilized. See operation 52 of FIG. 7. In instances in which each of the batteries will be identical, such as in terms of its output power, a number of batteries is determined that have an aggregate output power sufficient to fully satisfy the power requirements for the particular vehicular application under design. Thereafter, the vehicular platform is designed to have a number of battery module interfaces at least equal in number to the number of batteries that are required in order to satisfy the power requirements for the vehicular platform. See operation 54 of FIG. 7. As described above, the battery interface modules may be positioned side-by-side such that the transmission interface of one battery interface module is connected to a transmission interface of another battery interface module. Although the battery interface modules may be mounted within the vehicular platform in a variety of different manners, the battery interface modules of one embodiment are mounted upon a common rail 16, and the batteries, in turn, are mounted to respective ones of the battery interface modules, such as shown in FIG. 1 and in operation 56 of FIG. 7. As a result of the connection of the batteries to respective battery module interfaces, appropriate connections are established for power, fluid and data, resulting in a serial configuration of the batteries suitable to satisfy the power requirements of the vehicle.

By utilizing common interfaces, the battery interface modules 14 and, in turn, the batteries 12, are scalable to facilitate the design of vehicular power systems 10 that satisfy different power requirements. In addition, the batteries are readily maintainable as a result, for example, of the relatively simple insertion and removal of the batteries permitted by the battery interface modules. Further, the capability of the vehicular power system of embodiments of the present disclosure to readily utilize different numbers of battery interface modules and corresponding batteries permit the efficient adaptation of the power systems so as to be tailored to the specific requirements of a vehicle. Additionally, the utilization of battery interface modules and batteries having standardized interfaces may allow savings in the manufacturing process.

Many modifications and other embodiments will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A battery interface module comprising:
    a housing;
    a battery interface carried by the housing and configured to interface with a battery, the battery interface comprising a first power bus interface, a first fluid interface and a first data interface;
    first and second transmission interfaces carried by the housing with at least one of the first and second transmission interfaces configured to interface with another battery interface module, each transmission interface comprising a second power bus interface, a second fluid interface and a second data interface, wherein the first and second power bus interfaces are in electrical communication, the first and second fluid interfaces are in fluid communication and the first and second data interfaces are communicably connected; and
    a bus bar positioned within the housing and electrically connecting the second power bus interfaces of the first and second transmission interfaces, wherein the first power bus interface is physically and electrically connected to the bus bar within the housing at a location intermediate of the second power bus interfaces of the first and second transmission interfaces.

2. A battery interface module according to claim 1 further comprising an internal data wiring harness extending between the first and second data interfaces.

3. A battery interface module according to claim 1 further comprising an address module to define the address of the battery interface module.

4. A battery interface module according to claim 1 wherein the housing comprises a plurality of exterior surfaces, and wherein the battery interface and the first and second transmission interfaces are carried by different exterior surfaces of the housing.

5. A battery interface module according to claim 1;
wherein one of the second power bus interfaces of the first and second transmission interfaces is male and another of the second power bus interfaces of the first and second transmission interfaces is female;
wherein one of the second fluid interfaces of the first and second transmission interfaces is male and another of the second fluid interfaces of the first and second transmission interfaces is female; and
wherein one of the second data interfaces of the first and second transmission interfaces is male and another of the second data interfaces of the first and second transmission interfaces is female.

6. A battery interface module according to claim 1 wherein the battery interface further comprises an alignment feature configured to facilitate alignment with the battery.

7. A modular vehicular power system comprising:
a plurality of batteries that collectively satisfy power requirements of a vehicle; and
a plurality of battery interface modules, each battery interface module comprising first and second transmission interfaces configured to establish power, fluid and data interfaces with other battery interface modules and a battery interface to provide power, fluid and data interfaces with a respective battery, wherein the battery interface includes a first power bus interface and the first and second transmission interface include second power bus interfaces;
wherein the first transmission interface of each battery interface module comprises power, fluid and data interfaces configured to mate with corresponding power, fluid and data interfaces, respectively, of the second transmission interface of another battery interface module,
wherein each battery interface module further comprises a bus bar electrically connecting the second power bus interfaces of the first and second transmission interfaces, wherein the first power bus interface is physically and electrically connected to the bus bar at a location intermediate of the second power bus interfaces of the first and second transmission interfaces.

8. A modular vehicular power system according to claim 7;
wherein the battery interface comprises a first fluid interface and a first data interface;
wherein each of the first and second transmission interfaces comprises a second fluid interface and a second data interface; and
wherein the first and second power bus interfaces are in electrical communication, the first and second fluid interfaces are in fluid communication and the first and second data interfaces are communicably connected.

9. A modular vehicular power system according to claim 8 wherein each battery interface module further comprises an internal data wiring harness extending between the first and second data interfaces.

10. A modular vehicular power system according to claim 7 wherein each battery interface module further comprises an address module to define the address of the battery interface module.

11. A modular vehicular power system according to claim 7 wherein the battery interface further comprises an alignment feature configured to facilitate alignment with the respective battery.

12. A method of satisfying power requirements of a vehicle, the method comprising:
providing a plurality of batteries that collectively satisfy the power requirements of the vehicle;
establishing connections between the plurality of batteries and a power bus, a data bus and a fluid coolant loop, wherein establishing connections comprises connecting each battery to a corresponding battery interface module and connecting a plurality of interconnected battery interface modules to the power bus, the data bus and the fluid coolant loop, wherein each battery interface module comprises first and second transmission interfaces configured to establish power, fluid and data interfaces with other battery interface modules and a battery interface to establish power, fluid and data interfaces with a respective battery, wherein the battery interface includes a first power bus interface and the first and second transmission interface include second power bus interfaces; and
establishing an electrical connection with a bus bar of each battery interface module between the second power bus interfaces of the first and second transmission interfaces, wherein the first power bus interface is physically and electrically connected to the bus bar at a location intermediate of the second power bus interfaces of the first and second transmission interfaces.

13. A method according to claim 12 wherein connecting the plurality of interconnected battery interface modules comprises connecting the battery interface modules in series.

14. A method according to claim 12 wherein the battery interface comprises a first fluid interface and a first data interface;
wherein each of the first and second transmission interfaces comprises a second fluid interface and a second data interface; and
wherein the first and second power bus interfaces are in electrical communication, the first and second fluid interfaces are in fluid communication and the first and second data interfaces are communicably connected.

15. A method according to claim 12 wherein each battery interface module further comprises an address module to define the address of the battery interface module.

16. A method according to claim 12 wherein connecting each battery to a corresponding battery interface module comprises aligning each battery with the corresponding battery interface module with corresponding alignment features carried by the battery and the corresponding battery interface module.

17. A battery interface module according to claim 1 further comprising a rail upon which the housing is mounted along with one or more other battery interface modules.

* * * * *